(12) United States Patent
Miranda et al.

(10) Patent No.: US 12,088,368 B2
(45) Date of Patent: Sep. 10, 2024

(54) SYSTEMS AND METHODS FOR SATELLITE SELECTION USING BEAMSCANNING TECHNIQUES

(71) Applicant: GOGO BUSINESS AVIATION LLC, Broomfield, CO (US)

(72) Inventors: Heinz A. Miranda, Cary, IL (US); Michael H. Baker, Elmhurst, IL (US); Yong Liu, Chicago, IL (US); James P. Michels, Lake Zurich, IL (US)

(73) Assignee: GOGO BUSINESS AVIATION LLC, Broomfield, CO (US)

( * ) Notice: Subject to any disclaimer, the term of this patent is extended or adjusted under 35 U.S.C. 154(b) by 38 days.

(21) Appl. No.: 18/162,831

(22) Filed: Feb. 1, 2023

(65) Prior Publication Data

US 2024/0259055 A1 Aug. 1, 2024

Related U.S. Application Data

(60) Provisional application No. 63/426,389, filed on Nov. 18, 2022.

(51) Int. Cl.
*H04B 7/04* (2017.01)
*H04B 7/0426* (2017.01)
(Continued)

(52) U.S. Cl.
CPC ......... *H04B 7/043* (2013.01); *H04B 7/18558* (2013.01); *H04B 7/2041* (2013.01)

(58) Field of Classification Search
CPC ... H04B 7/043; H04B 7/18558; H04B 7/2041
See application file for complete search history.

(56) References Cited

U.S. PATENT DOCUMENTS 7,627,284 B2 * 12/2009 Wang .................. H04B 7/1858
455/430
8,897,769 B2 * 11/2014 Miller ..................... H04B 7/19
455/12.1

(Continued)

FOREIGN PATENT DOCUMENTS

EP 3334060 A1 6/2018

OTHER PUBLICATIONS

International Application No. PCT/US2023/079951, International Search Report and Written Opinion, mailed Feb. 28, 2024.

(Continued)

*Primary Examiner* — Dac V Ha
(74) *Attorney, Agent, or Firm* — MARSHALL, GERSTEIN & BORUN LLP

(57) ABSTRACT

Systems and methods are described for connecting with LEO satellites while reducing emissions toward GEO satellite communications. A system to implement the instant techniques may include a system comprised of a user communications equipment and a LEO constellation. The user equipment ("UE") may comprise a communications modem and an active antenna unit with a transmit and receive beamformer. In further implementations, the UE may include additional receive only beamformers. The LEO constellation can have a regenerative payload or bent pipe, and can include orbits at different altitudes. Methods as described herein may include a procedure by which the user equipment and LEO satellite work together to identify candidate serving satellites, and select the one that allows to meet the power density requirements to avoid interfering with the GEO satellites.

20 Claims, 9 Drawing Sheets

(51) Int. Cl.
*H04B 7/185* (2006.01)
*H04B 7/204* (2006.01)

(56) References Cited

U.S. PATENT DOCUMENTS

| | | |
|---|---|---|
| 9,711,850 B2 | 7/2017 | Naym et al. |
| 10,355,778 B1 | 7/2019 | Noerpel et al. |
| 10,833,757 B1 | 11/2020 | Roger et al. |
| 11,362,732 B2 | 6/2022 | Wendling |
| 2001/0045494 A1* | 11/2001 | Higgins ............ H04B 7/195 |
| | | 244/158.4 |
| 2019/0007129 A1* | 1/2019 | Vargas ............ H04B 7/1858 |

OTHER PUBLICATIONS

Lu et al., "Formation Design and Accuracy and Analysis of GEO-LEO Bistatic InSAR System", downloaded on Sep. 23, 2022 from IEEE Xplore, 4 pages.

\* cited by examiner

| 1 LAT | 2 HEADING | 3 AZLEO | 4 EILEO | 5 GEOIMPACTED | 6 GEOIMPACTEDTAPER1 | 7 GEOIMPACTEDTAPER2 |
|---|---|---|---|---|---|---|
| 0 | 0 | -180 | 40 | 0 | 0 | 0 |
| 2 | 0 | -180 | 40 | 0 | 0 | 0 |
| 4 | 0 | -180 | 40 | 0 | 0 | 0 |
| 6 | 0 | -180 | 40 | 0 | 0 | 0 |
| 8 | 0 | -180 | 40 | 0 | 0 | 0 |
| 10 | 0 | -180 | 40 | 0 | 0 | 0 |
| 12 | 0 | -180 | 40 | 0 | 0 | 0 |
| 14 | 0 | -180 | 40 | 0 | 0 | 0 |
| 16 | 0 | -180 | 40 | 1 | 0 | 0 |
| 18 | 0 | -180 | 40 | 0 | 0 | 0 |
| 20 | 0 | -180 | 40 | 1 | 0 | 0 |
| 22 | 0 | -180 | 40 | 0 | 0 | 0 |
| 24 | 0 | -180 | 40 | 1 | 0 | 0 |
| 26 | 0 | -180 | 40 | 0 | 0 | 0 |
| 28 | 0 | -180 | 40 | 1 | 0 | 0 |

FIG. 5

SYSTEMS AND METHODS FOR SATELLITE SELECTION USING BEAMSCANNING TECHNIQUES

FIELD OF THE DISCLOSURE

Systems and methods are disclosed for establishing a connection with low earth orbit ("LEO") satellites while reducing emissions toward geostationary earth orbit ("GEO") satellites.

BACKGROUND

Non-Geostationary orbit (also referred to as "NGSO") satellite systems operating in the kurz-under ("Ku") and kurz-above ("Ka") bands are governed by the operation standards defined by the ITU RR Article 22 and related guidance (e.g., R-REC-S.672-4, R-REC-S.1503-3). Those operation standards protect incumbent satellite systems, particularly Geostationary orbit (also referred to as "GSO") systems, by setting limits in power density levels and antennae radiation patterns. The operation standards therefore include constraints in transmissible power levels, antenna size, side lobe levels, and other similar parameters that NGSO systems are expected to observe.

Meeting the ITU rules brings different technical challenges, particularly if antenna size is a constraint. In some cases, those constraints could be best satisfied by selecting a serving satellite that is not the closest one. An additional challenge is the mobile nature of the user equipment (also referred to as "UE"). Such mobility brings additional complexity on the schemes to track the satellite locations while keeping good levels of performance and meeting the ITU rules. As such, systems and methods for monitoring and regulating power flux density in satellite communications for a mobile UE are desired.

SUMMARY

In one aspect, a computer-implemented method of wirelessly selecting and communicating with a satellite while minimizing emissions to other satellite connections is provided. The method may be implemented via one or more local or remote processors, servers, transceivers, and/or other electronic or electrical components. In one instance, the method may include (1) determining, by one or more processors, an orbital trajectory for one or more satellites using satellite constellation orbital information; (2) searching, by the one or more processors, within the orbital trajectory for synchronization signals from at least some of the one or more satellites using a transmitting/receiving beamformer associated with a mobile user equipment (UE); (3) generating, by the one or more processors, a set of potential antenna angles for an antenna array associated with the mobile UE and corresponding indications of whether communications for each of the set of potential angles will impact the other satellite connections; (4) selecting, by the one or more processors and based on at least the set of potential antenna angles, a satellite of the one or more satellites with which the mobile UE can communicate while maintaining a noise rise level with the other satellite connections that does not meet a predetermined threshold value; and (5) facilitating, by the one or more processors, communication between the mobile UE and the selected satellite in accordance with the set of potential antenna angles and the corresponding indications.

In a variation of the embodiment, the set of potential antenna angles and corresponding indications of whether communications for each of the set of potential angles will impact the other satellite connections includes a lookup table, and each potential antenna angle includes at least one of a latitude, a heading, a steering azimuth, or a steering elevation.

In another variation of the embodiment, the predetermined threshold value is a predetermined power density flux threshold value and the selecting the satellite includes: determining whether each of the set of potential antenna angles causes a power density flux of any of the other satellite connections to meet the predetermined power density flux threshold value.

In a further variation of the embodiment, the method further comprises: determining whether each of the set of potential antenna angles with a tapering filter applied causes a tapered power density flux of any of the other satellite connections to meet the predetermined power density flux threshold value.

In another further variation of the embodiment, the tapering filter is a first tapering filter, the tapered power density flux is a first tapered power density flux, and the method further comprises: responsive to determining that a potential antenna angle of the set of potential antenna angles with the first tapering filter applied causes the first tapered power density flux of any of the other satellite connections to meet the predetermined power density flux threshold value, determining whether the potential antenna angle with a second tapering filter applied causes a second tapered power density flux of any of the other satellite connections to meet the predetermined power density flux threshold value.

In another variation of the embodiment, the transmitting/receiving beamformer is a first beamformer and the method further comprises: searching within the orbital trajectory for neighboring satellites using a second beamformer.

In another variation of the embodiment, the transmitting/receiving beamformer is at least one of: (i) a rectangular phased antenna array, (ii) a circular array, or (iii) a vehicle shape specific array.

In another variation of the embodiment, the method further comprises detecting that: (i) the UE will be in a coverage zone associated with the satellite of the one or more satellites for at least a predetermined period of time, and (ii) the communications with the satellite of the one or more satellites are unlikely to cause the noise rise level with the other satellite connections to exceed the predetermined threshold for at least the predetermined period of time; wherein the facilitating is responsive to the detecting.

In another variation of the embodiment, the satellite of the one or more satellites is a first satellite and the method further comprises determining at least one of: (i) a UE associated with the transmitting/receiving beamformer is near an edge of a coverage zone associated with the first satellite or (ii) the communications with the first satellite are likely to cause the noise rise level with the other satellite connections to exceed the predetermined threshold; identifying a second satellite for communication according to the set of potential antenna angles; and performing a handover from the first satellite to the second satellite.

In another variation of the embodiment, the other satellite connections include connections between one or more other UE different than the mobile UE and one or more geosynchronous earth orbit (GEO) satellites.

In one aspect, a system for wirelessly selecting and communicating with a satellite while minimizing emissions to other satellite connections is provided. In one instance, the system may include: (1) an antenna array configured to facilitate communications between a mobile user equipment (UE) and satellites, the antenna array associated with the mobile UE; (2) a transmitting/receiving beamformer configured to search for synchronization signals from satellites and associated with the mobile UE; and (3) the user equipment including one or more processors and a memory storing one or more instructions that, when executed, cause the one or more processors to: (i) determine an orbital trajectory for one or more satellites using satellite constellation orbital information; (ii) cause the transmitting/receiving beamformer to search within the orbital trajectory for synchronization signals from the at least some of the one or more satellites; (iii) generate a set of potential antenna angles for the antenna array and corresponding indications of whether communications for each of the set of potential angles will impact the other satellite connections; (4) select, based on at least the set of potential antenna angles, a satellite of the one or more satellites with which the mobile UE can communicate while maintaining a noise rise level with the other satellite connections that does not meet a predetermined threshold value; and (5) facilitate communication between the mobile UE and the selected satellite in accordance with the set of potential antenna angles and the corresponding indications.

In a variation of the embodiment, the set of potential antenna angles and corresponding indications of whether communications for each of the set of potential angles will impact the other satellite connections includes a lookup table, each potential antenna angle includes at least one of a latitude, a heading, a steering azimuth, or a steering elevation.

In another variation of the embodiment, the predetermined threshold value is a predetermined power density flux threshold value and the selecting the satellite includes: determining whether each of the set of potential antenna angles causes a power density flux of any of the other satellite connections to meet the predetermined power density flux threshold value.

In a further variation of the embodiment, the memory includes instructions that, when executed, further cause the one or more processors to: determine whether each of the set of potential antenna angles with a tapering filter applied causes a tapered power density flux of any of the other satellite connections to meet the predetermined power density flux threshold value.

In another further variation of the embodiment, the tapering filter is a first tapering filter, the tapered power density flux is a first tapered power density flux, and the memory includes instructions that, when executed, further cause the one or more processors to: responsive to determining that a potential antenna angle of the set of potential antenna angles with the first tapering filter applied causes the first tapered power density flux of any of the other satellite connections to meet the predetermined power density flux threshold value, determine whether the potential antenna angle with a second tapering filter applied causes a second tapered power density flux of any of the other satellite connections to meet the predetermined power density flux threshold value.

In another variation of the embodiment, the transmitting/receiving beamformer is a first beamformer and the memory includes instructions that, when executed, further cause the one or more processors to: cause a second beamformer to search within the orbital trajectory for neighboring satellites using a second beamformer.

In another variation of the embodiment, the antenna array is at least one of: (i) a rectangular phased antenna array, (ii) a circular array, or (iii) a vehicle shape specific array.

In another variation of the embodiment, the memory including instructions that, when executed, further cause the one or more processors to: detect that: (i) the UE is in a coverage zone associated with the satellite of the one or more satellites for at least a predetermined period of time, and (ii) the communications with the satellite of the one or more satellites are unlikely to cause the noise rise level with the other satellite connections to exceed the predetermined threshold for at least the predetermined period of time; wherein the facilitating is responsive to the detecting.

In another variation of the embodiment, the satellite of the one or more satellites is a first satellite and the memory includes instructions that, when executed, further cause the one or more processors to: determine at least one of: (i) the UE associated with the transmitting/receiving beamformer is near an edge of a coverage zone associated with the first satellite or (ii) the communications with the first satellite are likely to cause the noise rise level with the other satellite connections to exceed the predetermined threshold; identify a second satellite for communication according to the set of potential antenna angles; and perform a handover from the first satellite to the second satellite.

In another variation of the embodiment, the other satellite connections include connections between one or more other UEs different than the mobile UE and one or more geosynchronous earth orbit (GEO) satellites.

This summary is provided to introduce a selection of concepts in a simplified form that are further described in the Detailed Descriptions. This summary is not intended to identify key features or essential features of the claimed subject matter, nor is it intended to be used to limit the scope of the claimed subject matter.

Advantages will become more apparent to those of ordinary skill in the art from the following description of the preferred aspects, which have been shown and described by way of illustration. As will be realized, the present aspects may be capable of other and different aspects, and their details are capable of modification in various respects. Accordingly, the drawings and description are to be regarded as illustrative in nature and not as restrictive.

BRIEF DESCRIPTION OF THE DRAWINGS

FIG. 5 depicts an exemplary table used to determine whether a connection with a LEO satellite at a particular latitude, heading, Azimuth, Elevation, etc. will impact a GEO satellite in terms of exceeding an EPFD-UP limit.

Figure 1:
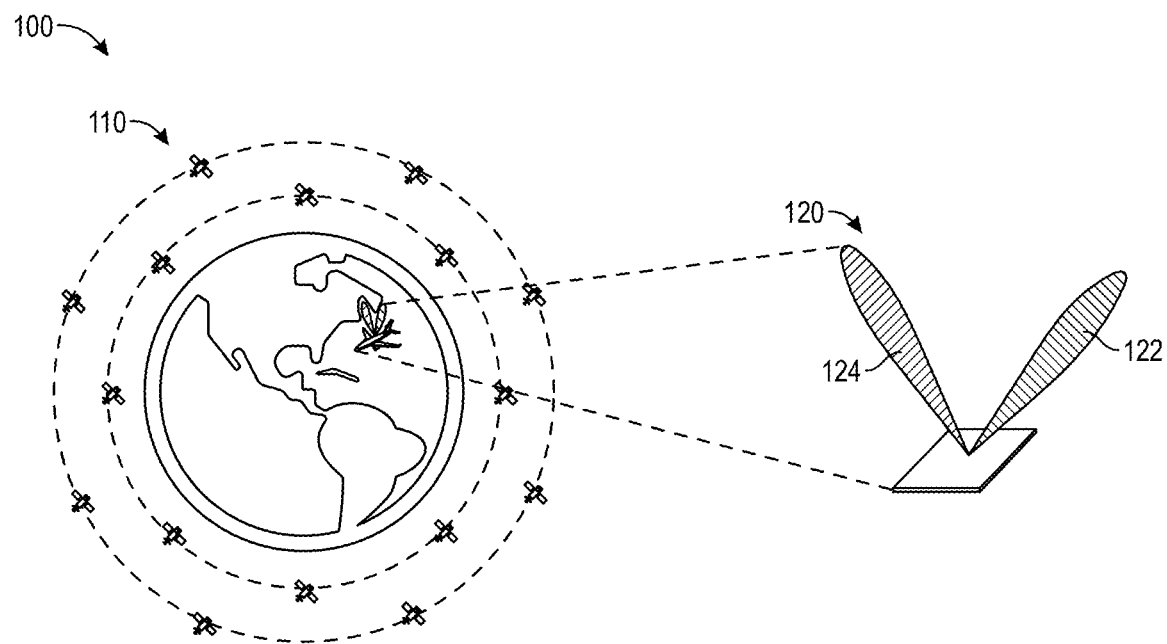
FIG. 1 depicts an exemplary diagram of an aircraft user equipment and LEO constellation.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

As described herein, a system to implement the instant techniques may include a system comprised of a user communications equipment and a satellite constellation, such as a LEO constellation. The user equipment ("UE") may comprise a communications modem and an active antenna unit with a transmit and receive ("Tx/Rx") beamformer (also referred to as a beamscanner, beam antenna, beamform antenna, beamscan antenna, etc.). In further implementations, the UE may include an additional receive only ("Rx") beamformer. The satellite constellation can have a regenerative payload or bent pipe, and can include orbits at different altitudes. Methods as described herein may include a procedure by which the user equipment and satellite work together to identify candidate serving satellites, and select the satellite that allows the UE to meet the power density requirements to avoid interfering with other satellites, such as GEO satellites.

By using pre-provision orbital only information in the user equipment, and using beam scan/sweeping techniques to find the exact location of the satellites and tracking, the system may solve the problem of connecting with a LEO satellite while reducing emissions toward GEO satellites. Additionally, the methods described herein may further include combining a beam scan with switching between wide and narrow beams to speed up the search of the satellites on each orbital plane. The method may include using beam scan/sweeping techniques, which removes the need to load the entire constellation ephemeris data on the user equipment and addresses the problem in satellite location determination under mobility.

An approach to satellite tracking and searching neighbor satellites for handovers using an additional Rx only beam may also be provided. This approach improves connection reliability and handover performance. This also provides robustness to inaccurate altitude information, improving the pointing accuracy.

The method may further include defining a table that indicates if a given combination of antenna steering angles, user heading, and latitude exceeds the EPFD-Up limit by a predefined margin. Such a method may similarly solve the problem of connecting with a LEO satellite while reducing emissions toward GEO satellites. The table provides indicators for antenna patterns with and without tapering applied to the beamforming weights. Depending on the implementation, the creation of the table may include as inputs at least some of: latitude, longitude, heading, altitude, pitch, roll, etc. This table can be loaded on the user equipment or the LEO satellite (or gateway in case of a bent pipe architecture). In the instant disclosure, the table may be referred to as EpfdUpMap, EPFD Map, EpfdUpTable, etc. The EpfdUpMap may be used as input to select a serving satellite and addresses the problem of meeting the ITU requirements. In some implementations, there may exist conditions where the UE may not select a serving satellite to which to transmit, such as when specific attitudes (combination of latitude, longitude, heading, pitch, and roll) occur or when no possible steering angle is found in the EpfdUpMap.

In one scenario, the use of a pre-loaded constellation orbital information to determine the orbital trajectory of the satellites combined with beam scan/sweeping techniques to search for synchronization signals using the Tx/Rx beam for initial system acquisition offers an improvement in connecting a mobile UE with satellite(s). Tracking is performed by forecasting the satellite position based on the orbital information and satellite feedback. In addition, if the UE is equipped with an additional Rx beam, the UE may use the additional beam: to speed up the search during initial system acquisition, for tracking correction, and/or for neighbor satellite search and measurements.

Conventional techniques rely on propagating the ephemeris information of a satellite at different points in time. However, such techniques not only require knowing the ephemeris information of each satellite on the constellation, but also for such information to be up to date. Such information is difficult to obtain for a mobile UE, as a mobile UE often does not have a fixed or easily predetermined position. Moreover, newer satellite constellations have thousands of satellites and determining future positions and potential communication directional emissions for all satellites is resource prohibitive. By using the beam scan techniques with direction of arrival estimation, initial search of synchronization signals can be accomplished while reducing delays. Once synchronization has been reached, the Rx-only beam is multiplexed in time between measuring the serving signal, correcting the steering of the Tx/Rx beam, and finding neighbor satellites and measuring their signals. Depending on the implementation, the multiplexing may be performed according to fixed time slots or by allocating more time slots to more critical procedures based on various parameters (e.g., signal strength, relative location, etc.). For example, in some implementations, the multiplexing depends on a time remaining in a coverage zone for a satellite. As such, in some such implementations, the Rx-only beam may instead be dedicated only to measuring neighboring satellites while reducing or removing the time spent correcting beam steering.

In another scenario, the system generates a table that returns a Boolean indicator for each combination of antenna pointing steering angles, user heading, and latitude. The Boolean indicator indicates whether that steering orientation will exceed an Equivalent Power Flux Density uplink (EPFD-Up) threshold. The steering angles are referenced to the antenna reference system (which is computed considering aircraft attitude). The table has additional columns for the case when tapering is applied to the antenna pattern. The system may create the EpfdUpMap table by computing the Equivalent Power Flux Density (EPFD) in the uplink direction for each combination of user equipment elevation and azimuth steering angle, as well as for each heading orientation and latitude position. The system may calculate the EPFD for each longitude location on the geostationary orbit. Then, the system compares the returning EPFD to a predetermined power flux density threshold value (e.g., the ITU limit of −160 dBm), including a predefined margin. The margin is meant to account for multiple users offering emissions toward the geostationary orbit. If any longitude location exceeds the threshold, a value of false (e.g., 0) for that combination of steering angles, heading, and latitude is set, otherwise the system sets the value to true (e.g., 1). The same computation is repeated using antenna patterns with tapering applied to reduce side lobes. In some implementations, the system only calculates the tapered antenna patterns when the value is determined to be false. Similarly, the system may calculate an antenna pattern using increased tapering after determining that a pattern with less tapering has a value of false. Otherwise, if the system determines an antenna pattern with less or no tapering has a value of true, the system may determine that all patterns with greater tapering also have a value of true. As such, the system determines feasible steering angles at the expense of reduced gain.

In another scenario, creating tables for every single azimuth/elevation steering angle, heading, and latitude uses a large allocation of memory, which may become impractical. Therefore, the system can generate a table that increments values by larger consistent values (e.g., increments each factor by 10, 5, 2, etc. values). In some implementations, the system increments factors by nonlinear increments to add more granularity in sensitive regions. Such an approach significantly reduces the memory requirements while keeping the same functionality and maintaining minimum performance impact. Additional reduction can be obtained by exploiting the symmetry of the table (e.g., determining that half of the values for a particular factor mirror another half, and thus determining not to record said values).

In another scenario, the use of the EpfdUpMap to determine if steering to a given satellite will cause the communications to exceed the EPFD-Up limit plus some margin offers an improvement in connecting a mobile UE with satellite(s). For example, as discussed herein, the EpfdUpMap may include indications for the case of beamforming without tapering only or add additional entries for cases with tapering. As such, the system may determine if tapering would need to be applied to meet the limit, providing additional options in certain implementations (e.g., in instances in which no alternative LEO satellite servers are available). The system may make such a determination at the user equipment or at the satellite (or gateway in case of a bent pipe implementation).

The system may be comprised of a constellation-based satellite(s) functioning as a Radio Access Network ("RAN") and a user communications equipment functioning as a UE. The RAN may comprise a LEO constellation, which can have regenerative or bent pipe payload and can include orbits at different altitudes and supporting gateways on the ground. The RAN provisioning information can also include the EpfdUpMap, such as in the case of a single transmit and receive beamformer. The satellite may broadcast the time in the future when it is expected to leave the coverage of a cell. The satellite may also broadcast the minimum expected connected time, Tec_min (e.g., the minimum time duration to allow a useful data transfer), which may include the sum of connection setup and release durations.

The UE may comprise a communications modem and an active antenna unit with a transmit and receive beamformer. In some implementations, the UE further comprises additional receive only beamformers. The UE provisioning information may include the following: constellation orbital information; frequencies and polarizations used in the constellation; and/or EpfdUpMap.

The UE may continuously update in an expected connected time, Tec, which may include the time left under the coverage of the current serving satellite.

In the context of such a system, some methods may include a procedure by which the UE and satellite work together to identify candidate serving satellites and select the one that allows the communications between the UE and satellite(s) to meet the power density requirements to avoid interfering with other satellites.

FIG. 1 illustrates an example communications system to implement the techniques described herein. In particular, FIG. 1 depicts an aircraft terminal 120 (also referred to herein as UE 120) comprising two beamformers (also referred to herein as beamforming antennae). Depending on the implementation, each beamforming antenna may transmit and/or receive a beam to and/or from a satellite. In the exemplary implementation of FIG. 1, the UE 120 communicates with a satellite RAN via a transmission/receiving (e.g., Tx/Rx) beam 122 and a receiving (Rx) beam 124.

The UE 120 communicates with a satellite 115 (also referred to as a "satellite RAN 115," "RAN 115," etc.) as part of an orbital constellation 110 of satellites. Depending on the implementation, the orbital constellation 110 may include one or more satellites, such as low Earth orbit (LEO) satellites, medium Earth orbit (MEO) satellites, geostationary orbit (GEO) satellites, and/or any other such type of satellite. LEO satellites may refer to satellites with geocentric orbits below an altitude of 2000 km. Similarly, MEO satellites may refer to satellites with geocentric orbits between 2000 km and approximately 35786 km. GEO satellites may refer to satellites with geocentric orbits matching Earth's sidereal rotation period, and may have an altitude of approximately 35786 km. In some implementations, at least one satellite in an orbital constellation 110 is visible at any time from any location on Earth.

In some implementations, the movement(s) and position(s) of satellites in the orbital constellation 110 are consistent, predictable, and/or known ahead of time. As such, information regarding a particular satellite 115 and/or the constellation orbit 110 (e.g., satellite location, satellite name, satellite angle relative to a position on Earth, etc.) may be calculated, determined, and/or otherwise stored as ephemeris data. For stationary and/or ground-based systems, a UE may retrieve and/or calculate ephemeris data ahead of time (e.g., an hour ahead of time, a day ahead of time, a week ahead of time, etc.). Some such systems may then determine an angle to use to communicate with a satellite in the constellation orbit 110. In implementations in which the system is mobile and/or aerial, such as the exemplary embodiment of FIG. 1, the UE 120 may additionally or alternatively use the ephemeris data to determine a likely position and/or angle of communication for a satellite 115 within the constellation orbit 110 and begin searching for the precise location using the Tx/Rx beam 122 and/or Rx beam 124, as described in more detail with regard to FIG. 2 below.

It will be understood that, although FIG. 1 depicts a UE 120 including two beamforming antennae, that the UE 120 may include a single Tx/Rx antenna instead. Similarly, the UE 120 may include more than two antennae (e.g., a Tx antenna and an Rx antenna functioning in concert to perform the functionality of the Tx/Rx antenna as well as an additional Rx antenna to perform the functionality of the Rx antenna). Similarly, it will be understood that, although the disclosure herein generally refers to communicating with LEO satellites and protecting communications with GEO satellites, similar techniques as those described herein may be applied to other types of satellites and/or to protect other communications.

Figure 2:
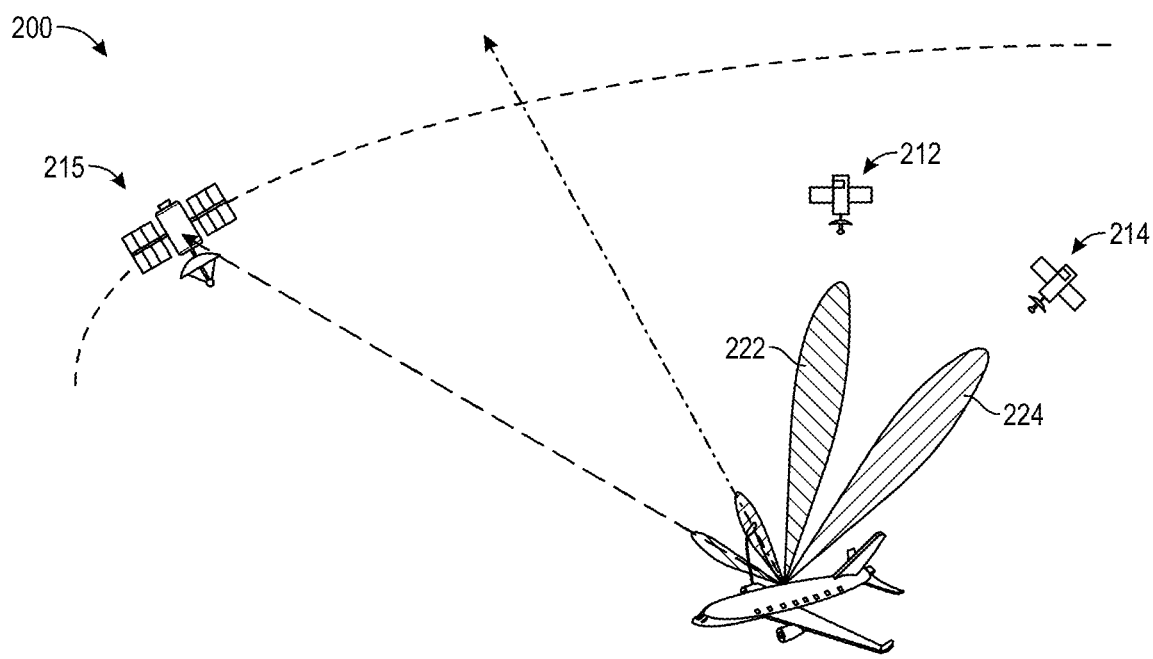
FIG. 2 depicts an exemplary illustration of communications with different LEO satellites and potential emissions toward GEO satellites.

As noted with regard to FIG. 1 above, mobile terminals connecting with satellites in an orbital constellation do not remain in place and thus are traditionally unable to make use of satellite ephemeris data detailing the location of satellites in the same way as stationary systems, introducing a number of challenges to be solved. One such challenge for satellite communications is to track the location of the satellites to make use of beamforming using a narrow enough beam to not only improve the signal power, but also to reduce emissions to other uses of the same frequency (e.g., such as in communications from other devices with GEO satellites). FIG. 2 illustrates how side lobes may create emissions to GEO stationary satellites, and how recalibrating and/or recalculating the direction may eliminate or reduce the side lobe impact on the GEO plane.

In particular, in some implementations, the UE 120 (e.g., a terminal on an aircraft) identifies a satellite 212 with which to communicate. A beam 222 between the UE 120 and the satellite 212 would allow for communication between the UE 120 and the satellite 212, but also generates secondary beam 232. In the exemplary implementation, satellite 215 is positioned such that the secondary beam 232 would intercept the satellite 215 and potentially cause emissions toward devices operating on the same frequency. In particular, the secondary beam 232 may cause a change in equivalent power flux density (referred to herein as EPFD, Epfd, cpfd, etc.). If the EPFD for the satellite 215 increases too much, then the secondary beam 232 causes emissions toward the satellite 215.

In some implementations, the UE 120 then switches to communicating with a different satellite in the orbital constellation, satellite 214. At the angle between the satellite 214 and the UE 120, the secondary beam 234 created by an antenna transmitting beam 224 does not intercept (and therefore does not interfere with communications to) other satellites. In further implementations, the UE 120 may determine that tapering may reduce the secondary beam 232 and/or the impact of the secondary beam 232 on the satellite 212 and applies the tapering rather than selecting another satellite. In some implementations, the UE 120 determines whether to apply tapering based on calculations performed and results stored in a table, as discussed in more detail below with regard to FIG. 5.

Depending on the implementation, the UE 120 may search for the additional satellite 214 using a secondary beamformer. For example, in some implementations in which the UE 120 includes multiple transmitting and/or receiving antennae, the UE 120 searches for and/or communicates with the first satellite 212 using the first beamformer while searching for the second satellite 214 with the second beamformer. In some such implementations, the first beam 222 is then a Tx/Rx beam such as beam 122 and beam 224 is an Rx beam such as beam 124, as described above with regard to FIG. 1.

Figure 3:
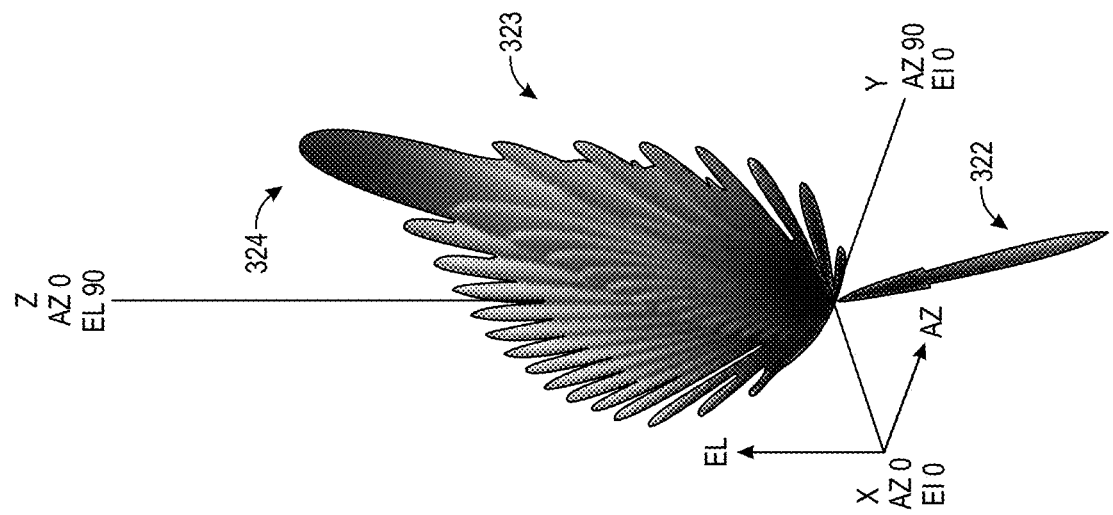
FIG. 3 depicts an exemplary depiction of a rectangular planar phased array of antennas and the emission shape from such an array.
Figure 3:
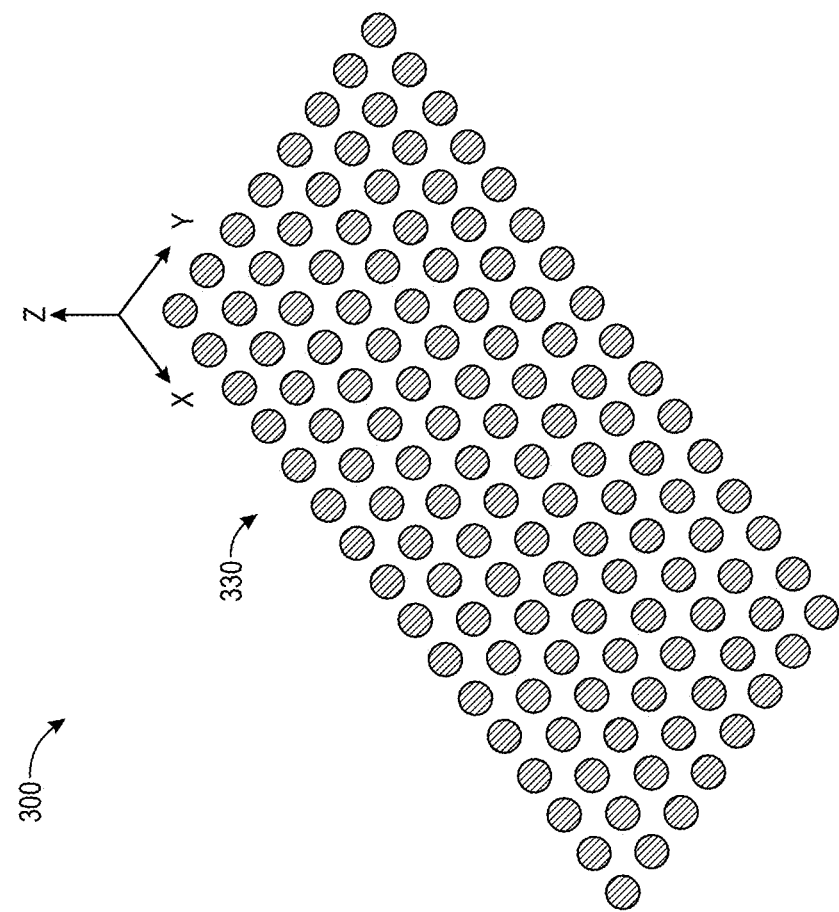

FIG. 3 illustrates a rectangular planar phased array 330 (also referred to herein as "array 330") and a representative antenna pattern 320. In some implementations, the antenna pattern 320 includes a primary beam 324, a secondary beam 322, and/or silos (e.g., offshoot beams) 323. The primary beam 324 is directed in the array 330 aims to communicate, and thus is often directed at a satellite using a particular azimuth (the y axis in the antenna pattern 320) and elevation (the x axis in the antenna pattern 320). The secondary beam 322 is weaker than the primary beam, but notably in a different direction than the target aimed at by the array 330. As such, the secondary beam 322 is at risk of emitting unintentional signals toward a different satellite. In further implementations, the silos 323 point in a variety of directions off of the primary beam 324, but the stronger beams may be directed in the same direction as the primary beam 324. Depending on the implementation, the UE 120 may ignore the silos 323 when determining whether emissions are likely to occur as generally being weak enough or directed in the correct direction so as not to unintentionally intercept other satellites. In further implementations, the UE 120 calculates a likely direction for the silos 323 and determines whether the silos 323 may intercept the other satellite(s).

Depending on the implementation, the array 330 may be a linear planar array (e.g. a circular linear pattern array, a rectangular linear pattern array, a linear planar array designed to conform to the 3D shape of the plane, etc.). In implementations in which the array 330 is a circular array, the array 330 has circular symmetry which allows the UE 120 to the antenna pattern. In further implementations, a circular array further minimizes the size of the lookup table used to determine whether communications with a given satellite intercept other satellites (e.g., the EpfdUpMap as described with regard to FIG. 5 below). In further implementations, the array 330 is a rectangular array. In some such implementations, the UE 120 has half or partial symmetry (e.g., symmetry in two quadrants rather than in four) in communications due to the shape of the rectangular array. It will be understood that, although the array 330 in FIG. 3 is depicted herein as a rectangular array, other pattern arrays, such as a circular array, may also be used to implement the present techniques.

Figure 4:
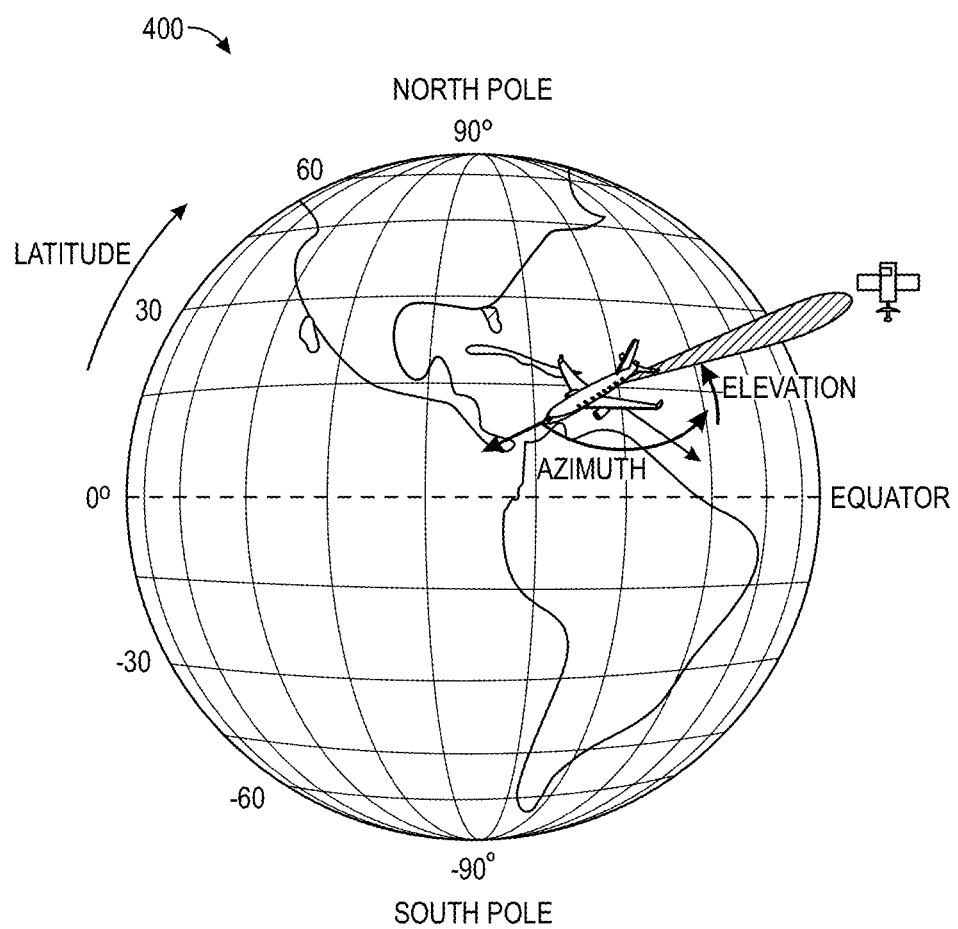
FIG. 4 depicts an exemplary illustration of a user equipment antenna steering.

FIG. 4 illustrates the geometry of the use case 400. In particular, a UE 120 connecting with a satellite 115 determines differences in azimuth, heading, latitude, elevation, etc. between the UE 120 and the satellite 115. As described herein, the UE 120 may determine such parameters based on known characteristics for the UE 120 (e.g., a current elevation of the UE 120 compared to the Earth, etc.), ephemeris data for the satellite 115 and/or a constellation orbit in which the satellite 115 is located, information gathered from and/or by searching for the satellite 115 using beam 424, etc. In some implementations, such as where the array is a rectangular array, the UE 120 evaluates the antenna pattern (such as antenna pattern 320 of FIG. 3) in all heading directions due to the half symmetry. In further implementations, the UE 120 may evaluate the antenna pattern at different latitude values. For example, in an implementation in which the UE 120 tries to connect to a LEO satellite and avoid emissions intercepting GEO satellites, to determine the impact on the entire GEO plane and given the symmetry of the LEO constellations, the UE 120 may generally determine values for the GEO satellites based on the longitude values rather than both latitude and longitude. In further implementations, the UE 120 may perform the evaluation on a predetermined half of parameter values (e.g., the positive latitude values), and the impact on the corresponding other half of the parameter values (here, the negative latitude values) may be the same.

FIG. 5 illustrates a lookup table 500 that the UE 120 generates, calculates, is provided with, and/or otherwise populates. In some implementations, the table 500 is representative of the potential EPFD for potentially impacted satellites. As such, the table 500 may be referred to as an EPFD Table, EPFD Up Table, EPFD Up Map, or other such variants. In the exemplary implementation of FIG. 5, the table 500 includes information related to the latitude 510 at which the antennae directs a beam, the heading 520 at which the antennae direct the beam, the azimuth 530 at which the satellite sits, the elevation 540 at which the satellite sits, a binary impact indication 550 on whether another satellite is impacted, a binary first taper impact indication 560 on whether another satellite is impacted when a first tapering pattern is applied, and a binary second taper impact indication 570 on whether another satellite is impacted when a second tapering pattern is applied. It will be understood that the arrangement of information is exemplary only, and that alternate implementations may include additional, fewer, or alternate information in a generated table. For example, depending on the implementation, the table 500 may additionally or alternatively include other aspects of aircraft attitude for an aircraft including a UE, such as heading, roll, pitch, etc.

In some implementations, the table 500 may include multiple latitudes 510 ranging from a minimum latitude to a maximum latitude, in predetermined increments. In some implementations, the latitudes 510 may range across the entire range of latitudes (e.g., −90 to 90). In further implementations, the latitudes 510 may range across half of the range of latitudes (e.g., 0 to 90, −90 to 0, etc.), a partial set of the latitudes based on the ephemeris data (e.g., 0 to 40), and/or any other similar arrangement of latitudes.

Similarly, in some implementations, the table 500 includes multiple headings 520, azimuths 530, elevations 540, etc. In some such implementations, the values for each include an absolute minimum and/or maximum where applicable (e.g., a maximum elevation may be 2000 km for LEO satellites and a minimum may be a predetermined distance above the Earth). In further such applications, the values may be predetermined, input by a user, determined based on a current position for the UE and/or expected positions for satellites in an orbital constellation, etc.

To create the table 500, antenna patterns for each steering direction are determined and populated. However, the satellites may move quickly (e.g., 7 minutes to complete an orbit). As such, in some implementations, in order to reduce memory requirements and increase speed, the steering directions (e.g., the latitude 510, the heading 520, the azimuth 530, and/or the elevation 540) can be determined in increments of a few degrees in azimuth, elevation, etc. As such, depending on the implementation, the increment size may be larger (e.g., 2, 5, 10, etc.) to ensure a practical table size. In further implementations, a column that increases by an increment size may include an increment size of 1 unit (e.g., degrees, km, m, etc.), so as to ensure each value within the range is checked. In still further implementations, the increment size is nonlinear to add granularity in sensitive regions (e.g., an increment size of 5 normally, but 1 when populating values between 30 to 40 degrees). Depending on the implementation, each column may have a unique increment, minimum value, maximum value, etc. or may share various characteristics with other columns.

In the exemplary embodiment of FIG. 5, the table 500 may have dimensions and/or increment values as defined by a user, determined at initial configuration or programming, as automatically determined based on UE 120 location, etc. For example, the exemplary implementation of FIG. 5 may have table 500 dimensions as follows: ucLatMin=0; ueLatMax=40; ucLatInc=2; ucLon=−90; ucHeadingMin=0; ucHeadingMax=360; ucHeadingInc=10; ucAzLeoMin=−180; ucAzLeoMax=180; ucAzLeoInc=10; ucEILcoMin=40; ueEILcoMax=90; and ucEILcoInc=2.

The table 500 further includes one or more impact indications 550 of whether transmissions from the UE 120 will likely impact another satellite other than the satellite with which the UE 120 intends to communicate (e.g., the satellite for which the azimuth 530 and/or elevation 540 are recorded in the table 500). Depending on the implementation, in addition to including an impact indication 550, the table 500 may include one or more taper impact indications 560 and/or 570. The impact taper indications 560 and/or 570 may perform a similar function to the impact indication 550 after a taper pattern is applied, as described herein. It will be understood that, although FIG. 5 depicts two taper impact indications 560 and 570, any appropriate number of taper impact indications may be used instead. For example, the table 500 may include taper indications for a maximum tapering, half tapering, quarter tapering, etc.

In some implementations, the impact and/or taper impact indications are binary indications and indicate whether a beam transmit by the UE 120 at the coordinates defined by the other columns (e.g., latitude 510, heading 520, azimuth 530, and elevation 540) will cause emissions to intercept another satellite. In further implementations, each impact and/or taper impact indication is a percentage instead, indicating the likelihood of interfering with another satellite. Depending on the implementation, the UE 120 may calculate a likelihood percentage but populate the table with a binary indication when the likelihood percentage satisfies a predetermined threshold (e.g., 50%, 75%, 100%, etc.).

Depending on the implementation, the likelihood of interfering with another satellite is based on a calculated power flux density. In some such implementations, for each degree in the GEO plane, the maximum power flux density may be computed as follows: pfdMax=eirp_dBW−gainUe2Lco+geo_epfdUpScaling+gainUe2Geo−IfsGeo+gainGeoGm, where: eirp_dBW is the effective isotropic radiated power (EIRP) in dBW; gainUe2Leo is the gain in the direction of steering; epfdUpScaling is the scaling for an expected worst case power density (e.g., 10*log 10(40c3/20e6)); gainUe2Geo is the gain in the direction of a given secondary satellite (e.g., GEO satellite) location; IfsGeo is the free space loss between the UE and the secondary satellite (e.g., GEO satellite) arc; and gainGeoGm is the expected worst case (e.g., highest) gain of the antenna for the secondary satellite (e.g., GEO satellite). In some implementations, the maximum power flux density formula may differ depending on the inputs to the table 500. For example, in implementations with additional aircraft attitude factors (e.g., heading, roll, pitch, etc.), the maximum power flux density formula may include one or more of the additional inputs depending on the effect the particular factor has on the flux density for the system. In further implementations, the additional inputs may serve as an indication to the UE 120 to cease transmission if a factor is input that falls outside of a predetermined range (e.g., meets or exceeds a roll or pitch threshold).

Then a particular combination of UE latitude, UE heading, and/or UE antenna steering angle may be considered as impacting the additional satellite if there is at least one GEO location evaluated where: pfdMax>epfdUpLimit−epfdUpMargin. The same procedure may be repeated with antenna patterns with a tapering pattern applied to the transmit beam.

In some implementations, the system may determine the table size of the table 500 in megabytes, assuming each value is a uint16 (2 bytes), in the following way: TableSize=length(ucLatMin:ueLatInc:ucLatMax)*length(ucHeadingMin:ucHeadingInc:ucHeadingMax)*length(ucAzLeoMin:ucAzLeoInc:ucAzLcoMax)*length(ucElLeoMin:ucEILcoInc:ucEILcoMax)*6*2*1e−6. Depending on the implementation, the table 500 may therefore have varying sizes based on the maximum, minimum, and/or increment values. For example, in the exemplary embodiments of FIGS. 5-7, the table size corresponds to 10 megabytes. In further examples, the table size may be 1 megabyte, 100 megabytes, 1 gigabyte, etc.

It will be understood that, in the examples below, the increments for a given attribute may be uniform. However, it will also be understood that the increments may not be uniform, and can have more granularity in sensitive areas (e.g., at lower latitudes) where more precise information would improve performance.

Figure 6A:
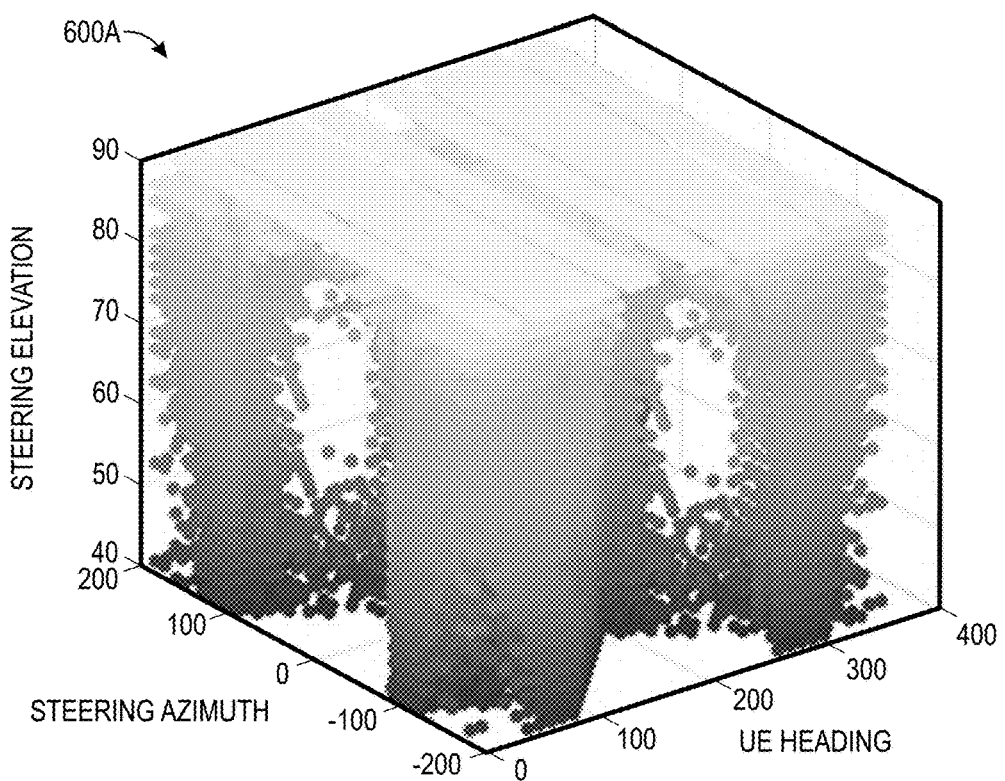
FIGS. 6A and 6B depict exemplary graphs illustrating steering and heading combinations that have an impact on GEO satellites at UE latitudes of 10 and 40 degrees, respectively.
Figure 6B:
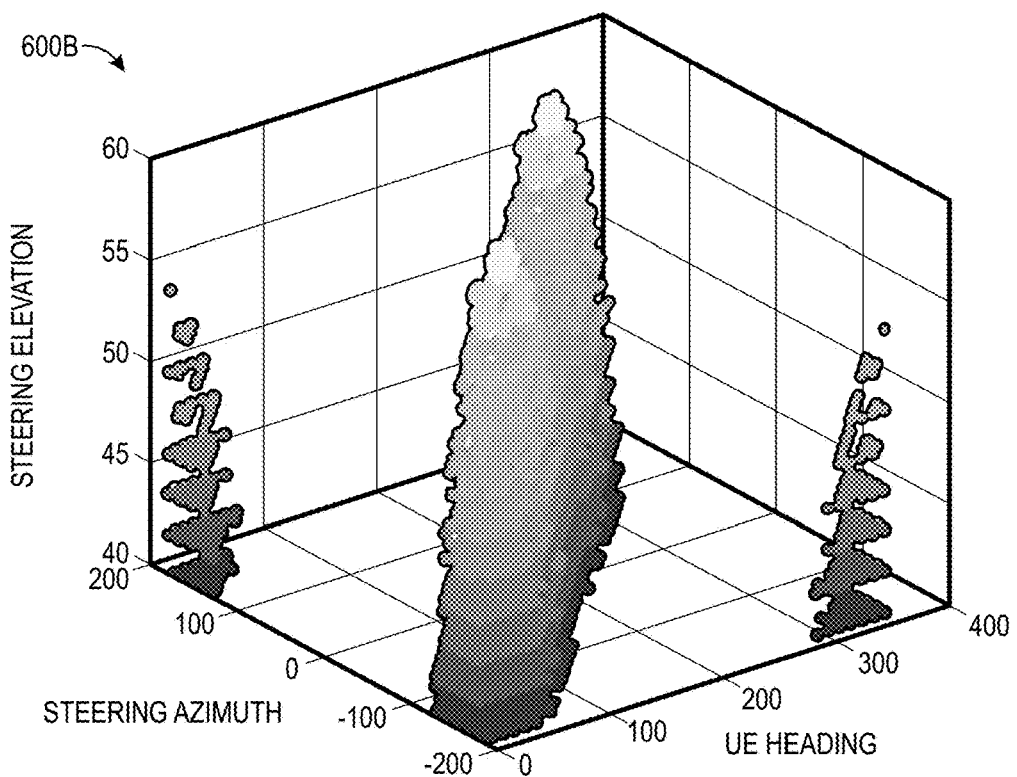

FIGS. 6A and 6B illustrate maps 600A and 600B corresponding to parts of an Epfd Up Map such as table 500 for two UE latitudes, 10 and 40 degrees, respectively. FIGS. 6A and 6B further depict angles combinations that impact another satellite (e.g., a satellite in the GEO orbit (value of 1 in the GeoImpacted columns of FIG. 5)). In some implementations, maps 600A and/or 600B might only show the combinations where another satellite, such as a satellite in the GEO plane, is impacted, otherwise no point is drawn.

In some implementations, the maps 600A and/or 600B might not include every single angle within the defined ranges, for example to save memory, processing power, etc. In such implementations, an interpolation methodology (e.g., piecewise constant interpolation, linear interpolation, polynomial interpolation, spline interpolation, mimetic interpolation, etc.) may be required. In some implementations, the UE 120 and/or a user associated with the UE 120 selects the closest combination of angles that provides an expected worst-case scenario. Such an approach allows a system implementing the instant techniques to determine that the steering direction, with tapering if needed, does not impact an additional satellite (e.g., a satellite on the GEO orbit).

As such, in some implementations, the system may follow one or more sets of guidelines and/or rules when any of the parameters is not present in the table for a given antenna array, such as the rectangular phased array illustrated in FIG. 3. It will be understood that specific approaches may need to be identified by data inspection to consider an applicable worst-case scenario. In some implementations, the guidelines may include a rule for latitude, such as the following: use the next lower latitude available since lower latitudes represent a worse possible scenario of impacting the appropriate plane. In further implementations, the guidelines may include a rule for elevation: data inspection shows that, when the elevation is less or equal to 20 degrees, selecting a higher elevation angle may provide a worse impact case. However, for elevation angles greater than 20 degrees, selecting a lower elevation angle may give a worse-case scenario. In still further implementations, the guidelines may similarly include a rule for heading and/or azimuth steering: the final impact can be determined by analyzing the impact of the heading and azimuth pair.

Figure 7:
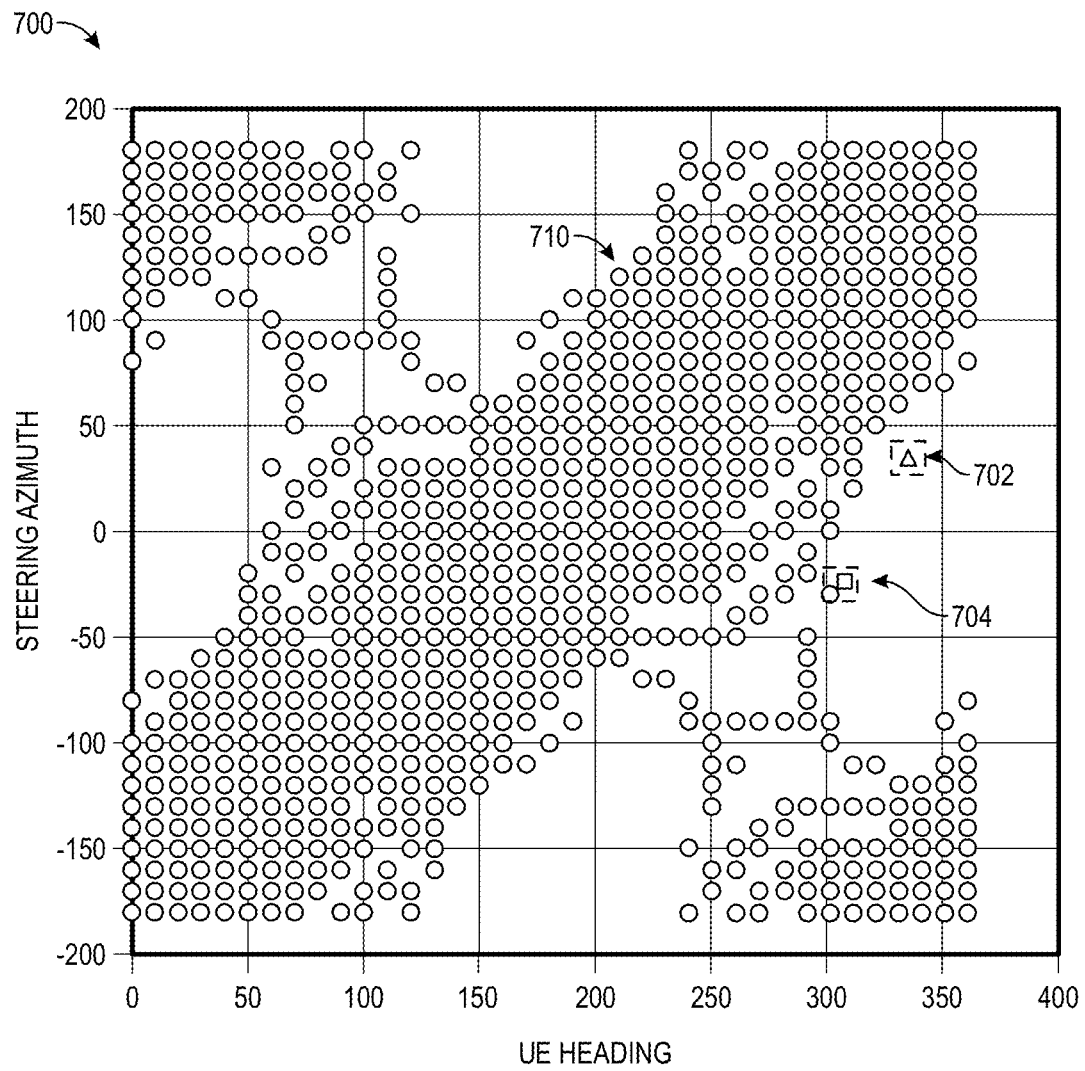
FIG. 7 depicts an exemplary graph illustrating an interpolation of the impact for steering angles missing in the table of FIG. 5.

FIG. 7 illustrates a graph 700 indicating points of impact for satellites at locations corresponding to a cut of the graph in FIG. 6A. In particular, the exemplary embodiment of FIG. 7 is set at a UE latitude of 10 and a steering elevation of 40, though it will be understood that any appropriate latitude and/or steering elevation may be used instead.

In some implementations, the graph 700 includes impact indications 710 at each azimuth/heading pairing that is likely to cause impact with a satellite. The system may generate impact indications 710 based on a table such as table 500 described with regard to FIG. 5 above. Depending on the implementation, the steering-heading point may be considered non-impacting so long as no impact indication 710 exists at the location. In further implementations, if all four closest combinations around the desired one have no impact, the steering may be considered non-impacting; otherwise, the steering may be considered impacting. For example, in the exemplary embodiment of FIG. 7, the combination impact point 704 represents the combination of interest. However, from the four closest available combinations, one shows impact. Therefore, such an orientation may not be feasible, and combination impact point 704 is discarded. In further implementations, the system then checks if any of the tapering options make the orientation feasible (e.g., as depicted in the table of FIG. 5). In still further implementations, then the UE 120 locates another orientation, such as non-impact point 702. Depending on the implementation, the UE 120 may location the additional orientation after or as an alternative to checking tapering options.

Figure 8:
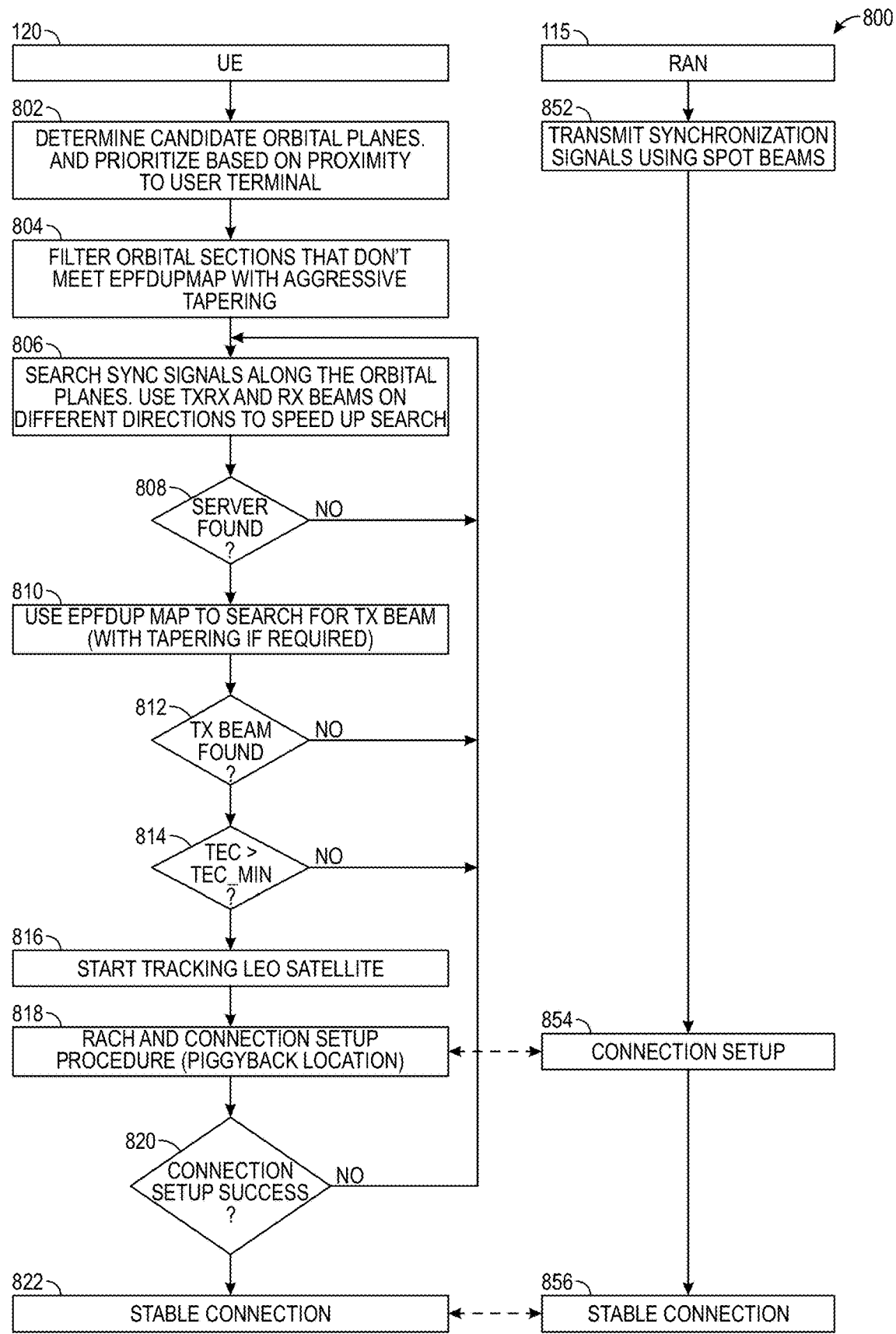
FIG. 8 depicts an exemplary flow diagram of a connection setup procedure between a UE and a LEO satellite.

FIG. 8 illustrates a method 800 for a connection setup procedure between a UE (e.g., UE 120) and a satellite RAN (e.g., RAN 115). It will be understood that, although the method 800 is described below with regard to the UE 120, RAN 115, and/or other components of a system as depicted by FIG. 1, the method 800 may be implemented by any similarly suitable system matching the characteristics as described herein.

At block 802, the UE 120 determines candidate orbital planes. Depending on the implementation, the UE 120 may additionally prioritize the candidate orbital planes based on proximity to the UE 120. In some implementations, the process may start with the UE 120 reading a current location and parsing the orbital information to determine the orbits that meet a minimum distance requirement to be possible servers.

At block 804, the UE 120 filters out orbital sections that intercept other satellites even with tapering. In some implementations, the UE 120 defines a set of steering angles before starting the actual search. In further implementations, the UE 120 uses the EpfdUpMap to filter out orbital sections that will not be feasible to point at without meeting EpfdUp+ margin, even with tapering. In further implementations, the UE 120 filters out orbital sections that cause emissions to intercept another satellite even with a maximum total tapering level. In further implementations, the UE 120 filters out orbital sections that cause emissions to intercept another satellite with a lower total tapering level.

At block 806, the UE 120 searches synchronization signals along the orbital planes. In some implementations, the UE 120 may perform the search for a synchronization signal by sweeping along each plane. In further implementations, to speed up the search, the beam used for the search can be a wider beam with enough gain to achieve DL synchronization. In still further implementations, the UE 120 uses a transmitting/receiving (Tx/Rx) beam and a receiving (Rx) beam to search in different directions. In some such implementations, the additional beam similarly speeds up the searching process. Depending on the implementation, the UE 120 may alternate the Tx/Rx and/or Rx beam(s) between wide and narrow beams to speed up the search of the satellites on each orbital plane.

At block 808, the UE 120 determines whether a potential satellite server (e.g., a LEO server) is found. In some implementations, if a potential server is found, the flow proceeds to block 810. In further implementations, if a potential server is not found, then flow returns to block 806.

Once a synchronization signal is found, at block 810, the UE 120 may use the generated table (e.g., EpfdUpMap) to determine if a transmit beam on the determined direction does not exceed the EPFD-Up+margin. In some implementations, the UE 120 further determines if a beam with tapering is needed to drop the power flux density below the predetermined threshold. As such, in some implementations, the UE 120 selects a satellite with the least aggressive tapering while refraining from impacting another satellite so as to maximize performance.

If a beam is found at block 812, the system may subsequently check at block 814 if the satellite in question will allow the UE 120 to have a connection for a minimum time by comparing Tec with Tec_min. If the check passes, the beamformer of the UE 120 may start tracking the particular satellite. As such, the UE 120 and the RAN 115 will be more likely to maintain a connection over which a user can access data and/or otherwise perform a task while reducing the likelihood of requiring a handover. In other implementations, if the transmission beam is not found, then flow returns to block 806. Similarly, if the Tec is less than the Tec_min, the UE 120 may determine not to connect with the particular satellite and instead flow returns to block 806.

At block 816, the UE 120 begins tracking the LEO satellite (e.g., RAN 115). In some implementations, the satellite tracking procedure may be performed by forecasting future positions based on the orbital information, satellite speed, and/or aircraft speed and location. If an additional receive beam is available, the additional beam can be used to implement an open tracking loop based on signal measurements. As part of the tracking procedure, the UE 120 may check the generated table (e.g., EpfdUpMap) using the forecasted positions to confirm that emissions thresholds are not surpassed.

At block 818, the UE 120 performs the RACH and/or Connection Setup procedure with the RAN 115. Depending on the implementation, the UE 120 may use time delay and/or frequency offset compensation techniques to account for the long range and frequency Doppler effect. If the UE 120 has a single beamformer, then, as part of the connection setup, the UE 120 may send its location and altitude information (e.g., "piggyback" the location of the UE 120). In such implementations, the information may be sent periodically through the connection, allowing the LEO RAN to determine when handovers are needed.

At block 820, the UE 120 determines whether the connection setup succeeded. In some implementations in which the connection setup is successful, then the flow continues to block 822 and the UE 120 has a stable connection with the RAN 115. In further implementations in which the connection setup is not successful, then the flow returns to block 806.

At block 852, the RAN 115 transmits synchronization signals. In some implementations, the RAN 115 transmits the synchronization signals using spot beams. Although the flowchart illustrated in FIG. 8, depicts block 852 occurring alongside block 802, it will be understood that such is for illustrative purposes only. As such, it will be understood that block 852 may occur at any point before, during, or after blocks 802-816.

At block 854, the RAN 115 performs a connection setup with the UE 102. In some implementations, the connection setup overlaps in time with the RACH and Connection Setup that the UE 120 performs at block 818. At block 856, the RAN 115 communicates with the UE 120 over a stable connection, similar to block 822 above.

Figure 9:
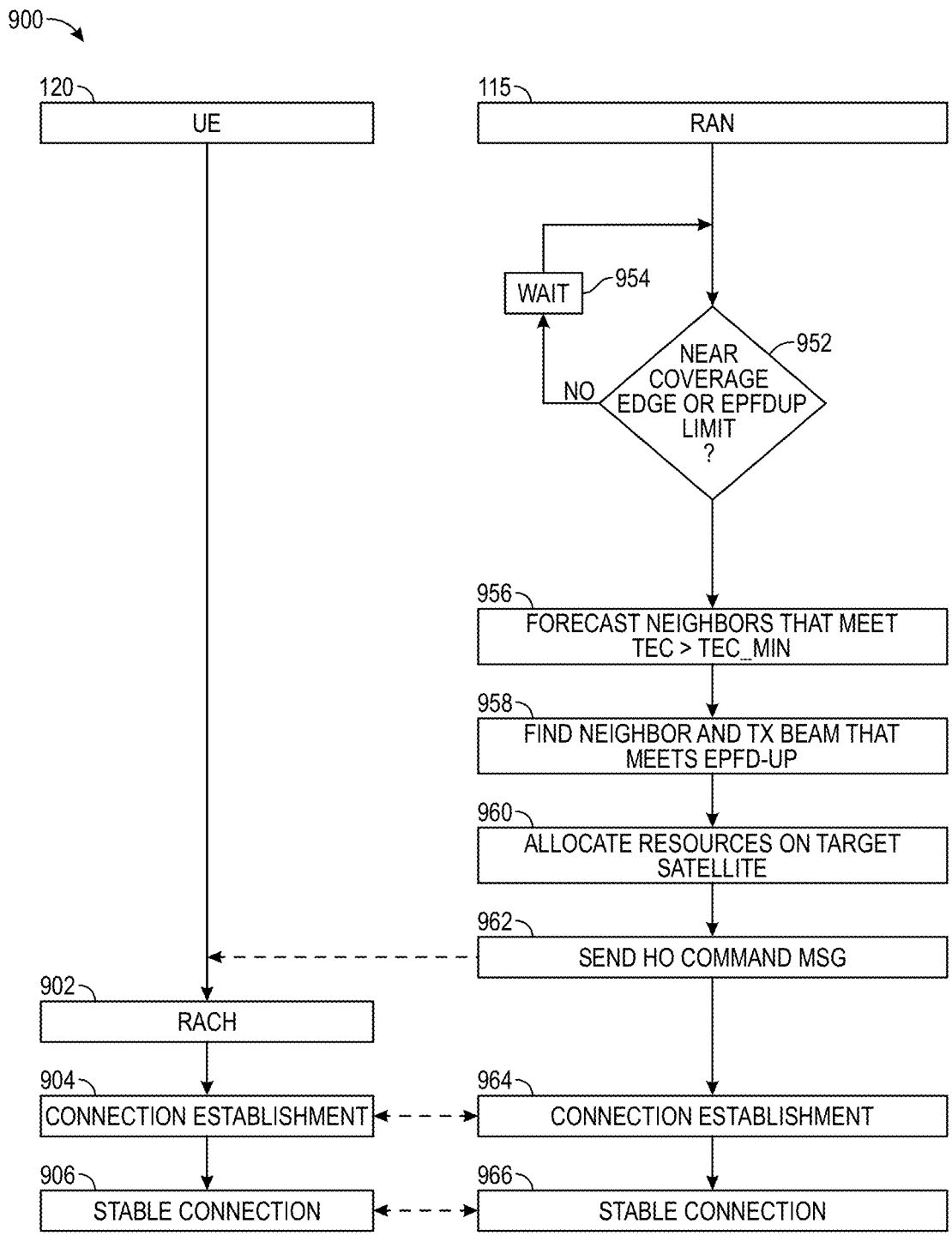
FIG. 9 depicts an exemplary flow diagram of a handover procedure for a UE with a single Tx/Rx beam.
Figure 10:
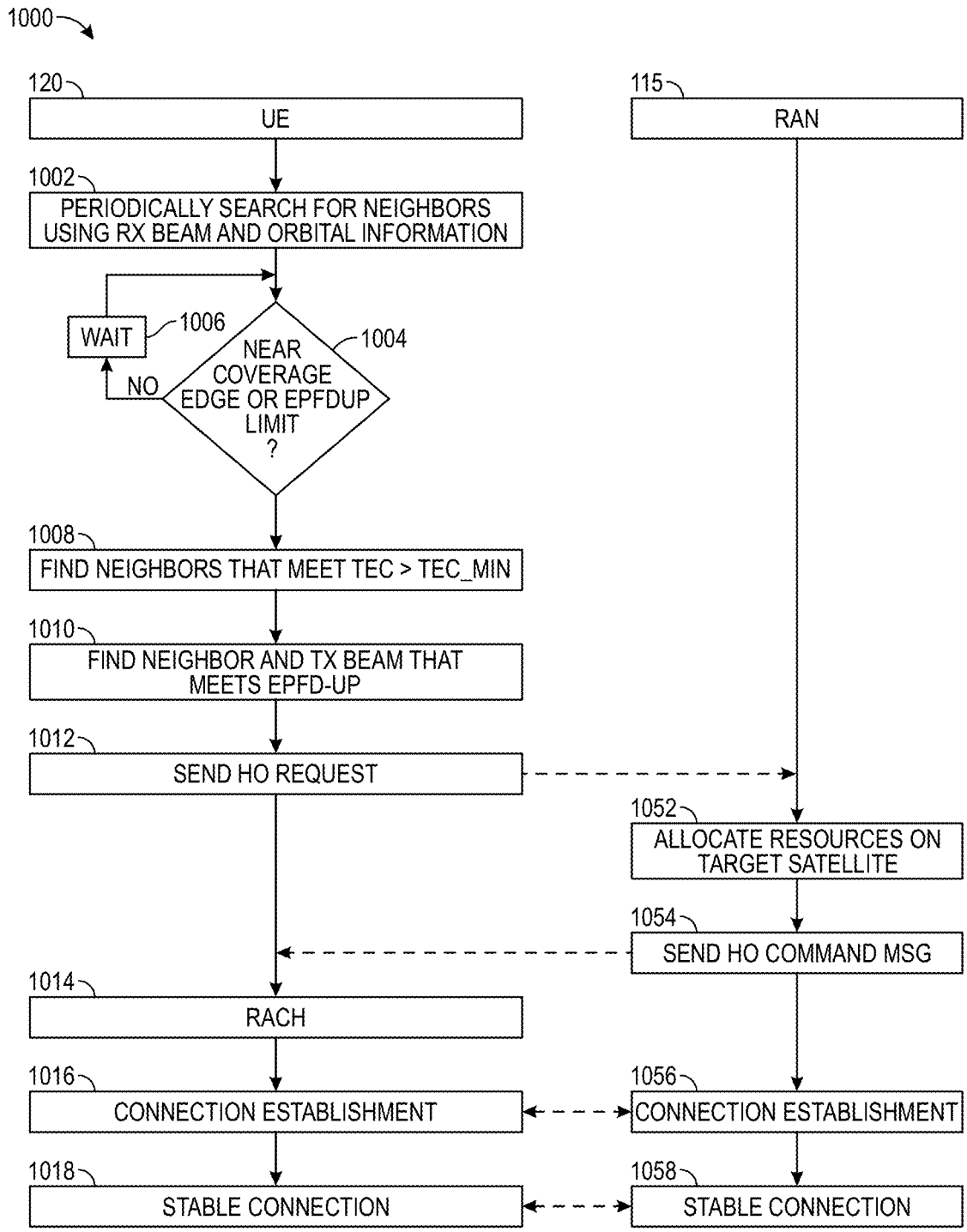
FIG. 10 depicts an exemplary flow diagram of a handover procedure for a UE with a Tx/Rx beam and an additional beam.

The handover procedures are illustrated in FIG. 9 and FIG. 10 for the cases when (i) the UE 120 has a single transmit and receive beamformer, or (ii) a transmit and receive beamformer and a second receive beamformer, respectively.

In the implementation in which the UE 120 has 2 receive beamformers, most of the decision making may occur at the UE 120. However, it will be understood that a combination of the techniques described in both FIG. 9 and FIG. 10 may be possible implementations of this disclosure.

FIG. 9 illustrates a method 900 for performing a handover procedure for a UE (e.g., UE 120) from a satellite in a RAN (e.g., RAN 115). It will be understood that, although the method 800 is described below with regard to the UE 120, RAN 115, and/or other components of a system as depicted by FIG. 1, the method 900 may be implemented by any similarly suitable system matching the characteristics as described herein.

At block 952, the RAN 115 continuously monitors whether the UE 120 is close to the edge of a coverage zone associated with the satellite in the RAN 115, or if the power flux density (e.g., the EpfdUp) limit is about to be exceeded for another satellite. When the RAN 115 does not detect that the UE 120 is close to the edge of the coverage zone (e.g., as determined via a function of time, signal strength, etc. as described in more detail below) or that the power flux density is near the limit, the RAN 115 remains in a holding pattern and flow continues to block 954, where the RAN 115 waits and performs functionality as normal. When the RAN 115 does detect such, however, then the RAN 115 may begin handover procedures and flow continues to block 956.

At block 956, the RAN 115 searches for and detects neighboring satellites that would be able to maintain a connection with the UE 120 for longer than a predetermined threshold time (e.g., Tec>Tec_min). At block 958, the RAN 115 searches for and finds a neighboring satellite and transmission beam that meets the power flux density (e.g., EPFD-Up) limits, as described herein. At block 960 the RAN 115 allocates resources for the target satellite detected in blocks 956 and 958.

At block 962, the RAN 115 (e.g., the currently connected satellite in the RAN 115) sends a handover command message to the UE 120. Depending on the implementation, the handover command message may be and/or include an immediate handover indication and/or one or more handover conditions. In some such implementations, if the conditions are no longer satisfied, the RAN 115 and/or the UE 120 may cancel the handover procedure and the system may resume searching for another connection.

At block 902, after receiving the handover command message from the RAN 115, the UE 120 performs an initial access procedure (e.g., a random access channel (RACH) procedure) with and begins the handover process, similar to block 818 as described with regard to FIG. 8 above. At blocks 904 and 964, the UE 120 performs the handover and establishes a connection with the new node in the RAN 115. The UE 120 then communicates with the new RAN over a stable connection at blocks 906. Similarly, the new node in the RAN 115 may ensure a stable connection for the UE 120 at block 966. In some implementations, the new node in the RAN 115 may finalize the connection at block 964 and then begin communicating with another device rather than ensure the connection is stable at block 966.

In some implementations, such as implementations in which the UE 120 has multiple beamformers, the UE 120 and the RAN 115 perform a handover as detailed in FIG. 10 rather than as detailed in FIG. 9.

FIG. 10 illustrates a method 1000 for performing a handover for a UE (e.g., UE 120) to a satellite node in a RAN (e.g., RAN 115). It will be understood that, although the method 800 is described below with regard to the UE 120, RAN 115, and/or other components of a system as depicted by FIG. 1, the method 1000 may be implemented by any similarly suitable system matching the characteristics as described herein.

At block 1002, the UE 120 searches for neighboring satellites using a receiving beam and orbital information while the other beamformer is used to maintain communications with an existing node in the RAN 115.

At block 1004, the UE 120 checks whether the UE 120 is near the edge of a coverage zone associated with the existing satellite in the RAN 115 or whether the UE 120 is approaching the power flux density (e.g., EpfdUp) limit for other satellites. When the UE 120 does not detect that the UE 120 is close to the edge of the coverage zone or that the power flux density is near the limit, the UE 120 remains in a holding pattern and flow continues to block 1006, where the UE 120 waits and performs functionality as normal, similar to block 952 of FIG. 9. When the UE 120 does detect such, however, then the UE 120 may begin handover procedures and flow continues to block 1008. In some implementations, the UE 120 detects that the UE 120 is close to the edge of the coverage zone based on a predetermined threshold time as defined herein (e.g., when a Tec threshold reaches a particular value, the UE 120 may determine when the satellite will not be able to illuminate the UE 120). In further implementations, the UE 120 may detect that the UE 120 is close to the edge of the coverage zone based on a signal strength of a connection to the satellite.

At blocks 1008 and 1010, the UE 120 searches for and detects neighboring satellites that would meet be able to maintain a connection with the UE 120 for longer than a predetermined threshold time (e.g., Tec>Tec_min) and transmits a transmission beam that meets the power flux density (e.g., EPFD-Up) limits, similar to blocks 956 and 958 as described above with regard to FIG. 9.

At block 1012, the UE 120 transmits a handover request to the new satellite in question, which the satellite in the RAN 115 receives and begins allocating resources for communication between the UE 120 and the RAN 115 at block 1052. After allocating the resources, flow continues to block 1054 and the RAN 115 transmits a handover command message to the UE 120.

The UE 120 then performs an initial access RACH procedure as described above with regard to block 902, before establishing a connection and communicating with the RAN 115 over the stable connection at blocks 1016/1056 and 1018/1058, as described herein.

It will be understood that, in other implementations, the handover procedure(s) and/or elements of the handover procedure may be implemented as a continuous scan for neighbor satellites, and the UE 120 and/or RAN 115 may trigger the handover procedures when the conditions above are met.

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

In addition, use of "a" or "an" is employed to describe elements and components of the embodiments herein. This is done merely for convenience and to give a general sense of the invention. This description should be read to include one or at least one and the singular also may include the plural unless it is obvious that it is meant otherwise.

Upon reading this disclosure, those of skill in the art will appreciate still additional alternative structural and functional designs for providing feedback to owners of properties, through the principles disclosed herein. Therefore, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed:

1. A method for wirelessly selecting and communicating with a satellite while minimizing emissions to other satellite connections, the method comprising:

determining, by one or more processors, an orbital trajectory for one or more satellites using satellite constellation orbital information;

searching, by the one or more processors, within the orbital trajectory for synchronization signals from at least some of the one or more satellites using a transmitting/receiving beamformer associated with a mobile user equipment (UE);

generating, by the one or more processors, a set of potential antenna angles for an antenna array associated with the mobile UE and corresponding indications of whether communications for each of the set of potential angles will impact the other satellite connections;

selecting, by the one or more processors and based on at least the set of potential antenna angles, a satellite of the one or more satellites with which the mobile UE can communicate while maintaining a noise rise level with the other satellite connections that does not meet a predetermined threshold value; and facilitating, by the one or more processors, communication between the mobile UE and the selected satellite in accordance with the set of potential antenna angles and the corresponding indications.

2. The method of claim 1, wherein the set of potential antenna angles and corresponding indications of whether communications for each of the set of potential angles will impact the other satellite connections includes a lookup table, and each potential antenna angle includes at least one of a latitude, a heading, a steering azimuth, or a steering elevation.

3. The method of claim 1, wherein the predetermined threshold value is a predetermined power density flux threshold value and the selecting the satellite includes:

determining whether each of the set of potential antenna angles causes a power density flux of any of the other satellite connections to meet the predetermined power density flux threshold value.

4. The method of claim 3, the method further comprising:

determining whether each of the set of potential antenna angles with a tapering filter applied causes a tapered power density flux of any of the other satellite connections to meet the predetermined power density flux threshold value.

5. The method of claim 4, wherein the tapering filter is a first tapering filter and the tapered power density flux is a first tapered power density flux, the method further comprising:

responsive to determining that a potential antenna angle of the set of potential antenna angles with the first tapering filter applied causes the first tapered power density flux of any of the other satellite connections to meet the predetermined power density flux threshold value, determining whether the potential antenna angle with a second tapering filter applied causes a second tapered power density flux of any of the other satellite connections to meet the predetermined power density flux threshold value.

6. The method of claim 1, wherein the transmitting/receiving beamformer is a first beamformer, the method further comprising:

searching within the orbital trajectory for neighboring satellites using a second beamformer.

7. The method of claim 1, wherein the antenna array is at least one of: (i) a rectangular phased antenna array, (ii) a circular array, or (iii) a vehicle shape specific array.

8. The method of claim 1, the method further comprising:

detecting that: (i) the mobile UE will be in a coverage zone associated with the satellite of the one or more satellites for at least a predetermined period of time, and (ii) the communications with the satellite of the one or more satellites are unlikely to cause the noise rise level with the other satellite connections to exceed the predetermined threshold for at least the predetermined period of time;

wherein the facilitating is responsive to the detecting.

9. The method of claim 1, wherein the satellite of the one or more satellites is a first satellite, the method further comprising:

determining at least one of: (i) the mobile UE is near an edge of a coverage zone associated with the first satellite or (ii) the communications with the first satellite are likely to cause the noise rise level with the other satellite connections to exceed the predetermined threshold;

identifying a second satellite for communication according to the set of potential antenna angles; and performing a handover from the first satellite to the second satellite.

10. The method of claim 1, wherein the other satellite connections include connections between one or more other UEs different than the mobile UE and one or more geosynchronous earth orbit (GEO) satellites.

11. A system for wirelessly selecting and communicating with a satellite while minimizing emissions to other satellite connections, the system comprising:

an antenna array configured to facilitate communications between a mobile user equipment (UE) and satellites, the antenna array associated with the mobile UE;

a transmitting/receiving beamformer configured to search for synchronization signals from satellites and associated with the mobile UE; and the user equipment including one or more processors and a memory storing one or more instructions that, when executed, cause the one or more processors to:

determine an orbital trajectory for one or more satellites using satellite constellation orbital information;

cause the transmitting/receiving beamformer to search within the orbital trajectory for synchronization signals from the at least some of the one or more satellites;

generate a set of potential antenna angles for the antenna array and corresponding indications of whether communications for each of the set of potential angles will impact the other satellite connections;

select, based on at least the set of potential antenna angles, a satellite of the one or more satellites with which the mobile UE can communicate while maintaining a noise rise level with the other satellite connections that does not meet a predetermined threshold value; and facilitate communication between the mobile UE and the selected satellite in accordance with the set of potential antenna angles and the corresponding indications.

12. The system of claim 11, wherein the set of potential antenna angles and corresponding indications of whether communications for each of the set of potential angles will impact the other satellite connections includes a lookup table, and each potential antenna angle includes at least one of a latitude, a heading, a steering azimuth, or a steering elevation.

13. The system of claim 11, wherein the predetermined threshold value is a predetermined power density flux threshold value and the selecting the satellite includes:

determining whether each of the set of potential antenna angles causes a power density flux of any of the other satellite connections to meet the predetermined power density flux threshold value.

14. The system of claim 13, wherein the memory includes instructions that, when executed, further cause the one or more processors to:

determine whether each of the set of potential antenna angles with a tapering filter applied causes a tapered power density flux of any of the other satellite connections to meet the predetermined power density flux threshold value.

15. The system of claim 14, wherein the tapering filter is a first tapering filter, the tapered power density flux is a first tapered power density flux, and the memory includes instructions that, when executed, further cause the one or more processors to:

responsive to determining that a potential antenna angle of the set of potential antenna angles with the first tapering filter applied causes the first tapered power density flux of any of the other satellite connections to meet the predetermined power density flux threshold value, determine whether the potential antenna angle with a second tapering filter applied causes a second tapered power density flux of any of the other satellite connections to meet the predetermined power density flux threshold value.

16. The system of claim 11, wherein the transmitting/receiving beamformer is a first beamformer and the memory includes instructions that, when executed, further cause the one or more processors to:

cause a second beamformer to search within the orbital trajectory for neighboring satellites using a second beamformer.

17. The system of claim 11, wherein the antenna array is at least one of: (i) a rectangular phased antenna array, (ii) a circular array, or (iii) a vehicle shape specific array.

18. The system of claim 11, the memory including instructions that, when executed, further cause the one or more processors to:

detect that: (i) the UE is in a coverage zone associated with the satellite of the one or more satellites for at least a predetermined period of time, and (ii) the communications with the satellite of the one or more satellites are unlikely to cause the noise rise level with the other satellite connections to exceed the predetermined threshold for at least the predetermined period of time;

wherein the facilitating is responsive to the detecting.

19. The system of claim 11, wherein the satellite of the one or more satellites is a first satellite and the memory includes instructions that, when executed, further cause the one or more processors to:

determine at least one of: (i) the UE associated with the transmitting/receiving beamformer is near an edge of a coverage zone associated with the first satellite or (ii) the communications with the first satellite are likely to cause the noise rise level with the other satellite connections to exceed the predetermined threshold;

identify a second satellite for communication according to the set of potential antenna angles; and perform a handover from the first satellite to the second satellite.

20. The system of claim 11, wherein the other satellite connections include connections between one or more other UEs different than the mobile UE and one or more geosynchronous earth orbit (GEO) satellites.

* * * * *